United States Patent [19]

Niwa

[11] Patent Number: 4,719,579
[45] Date of Patent: Jan. 12, 1988

[54] NUMERICAL CONTROL METHOD

[75] Inventor: Tomomitsu Niwa, Aichi, Japan

[73] Assignee: Mitsubishi Denki Kabushiki Kaisha, Tokyo, Japan

[21] Appl. No.: 937,427

[22] Filed: Dec. 3, 1986

Related U.S. Application Data

[63] Continuation of Ser. No. 613,474, May 23, 1984, abandoned.

[30] Foreign Application Priority Data

May 23, 1983 [JP] Japan ................... 58-90274

[51] Int. Cl.$^4$ ............... G06F 15/46; G05B 13/02
[52] U.S. Cl. ................... 364/474; 318/561
[58] Field of Search ............ 364/474, 475, 167–171, 364/148; 318/561

[56] References Cited

U.S. PATENT DOCUMENTS

| | | | |
|---|---|---|---|
| 3,784,798 | 1/1974 | Beadle et al. | 364/475 |
| 3,873,816 | 3/1975 | Takeyama et al. | 364/474 X |
| 4,078,195 | 3/1978 | Mathias et al. | 364/474 X |
| 4,208,718 | 6/1980 | Chung | 364/474 |
| 4,279,013 | 7/1981 | Cameron et al. | 364/474 X |
| 4,330,832 | 5/1982 | Kohzai et al. | 364/474 |
| 4,408,280 | 10/1983 | Bedini et al. | 364/474 |
| 4,509,126 | 4/1985 | Olig et al. | 364/474 |
| 4,536,849 | 8/1985 | Borisch et al. | 364/474 X |

OTHER PUBLICATIONS

"Some New Solutions to Optimize Multitool Turning", Prof. Dr. Sc. Techn., Hans Jurgen Jacobs, pp. 169–179 of Proceedings of the Fourteenth Annual Meeting and Technical Conference of the Numerical Control Society, Mar. 13–16, 1977.

Primary Examiner—Joseph Ruggiero
Attorney, Agent, or Firm—Sughrue, Mion, Zinn, Macpeak & Seas

[57] ABSTRACT

A numerical control method for controlling a machine tool having a plurality of turrets including supplying a control device with data items indicative of cutting conditions for respective tools mounted on the turrets, a machining program, and material conditions of a workpiece to be cut by the machine tool for computing a capability required to cut the workpiece based on the supplied data items. It is then determined whether the value of the capability exceeds a range of an allowable capability of the machine tool or the tools. An output is issued to reduce the cutting conditions when the value of the capability exceeds the allowable capability range to correct the capability required to cut the workpiece to the allowable capability range of the machine tool or the tools. The reduced cutting conditions are issued to the machine tool for machining the workpiece.

4 Claims, 7 Drawing Figures

NUMERICAL CONTROL METHOD

This is a continuation of application Ser. No. 613,474, filed May 23, 1984, now abandoned.

BACKGROUND OF THE INVENTION

The present invention relates to an NC (Numerical Control) system and method, and more particularly to an NC system capable of automatically changing machining conditions so as to machine a workpiece within an allowable range of the capabilities of a machine tool or a machining tool controlled by the NC system.

NC machining systems machine a workpiece by specifying the position of a tool with respect to the workpiece in the form of corresponding numerical information. The NC machining system can machine workpieces of complex configuration with ease and high accuracy at a high production rate. There has been proposed a machine tool controlled by the NC machining system, such as a lathe having a plurality of tool bases.

With prior NC machining systems, all cutting conditions have been required to be computed by the operator, and it has been quite complex to determine cutting conditions so as not to exceed the allowable range of the power and torque of the machine tool. In particular, where a lathe having a single spindle motor and a plurality of turrets or tool bases is employed to cut a workpiece with the turrets, the load imposed on the lathe is determined by the sums of powers and torques for the various cutting conditions for the respective turrets, and hence the tendency is to exceed the allowable range of the cutting tools or the machine tool.

If the allowable range of a tool such as a cutting tool or a drill bit is exceeded, the limit at which the tool cuts the workpiece is also exceeded, thus resulting in breakage of the tool. If the allowable capability range of the lathe is exceeded, the spindle motor of the lathe is subjected to an undue load, and forces are imposed tending to damage the various parts of the machine, thereby adversely affecting the machine tool. Therefore, if the sums of powers and torques exceed the allowable range of a machine tool controlled by an NC system, the operator has to change cutting conditions and compute new cutting conditions again.

SUMMARY OF THE INVENTION

With the prior difficulties in view, it is an object of the present invention to provide an NC system capable of automatically determining cutting conditions in which a workpiece can be cut by a machine tool having a plurality of simultaneously usable turrets within an allowable range of capabilities of the machine tool or tools on the turrets.

To achieve the above object, an NC system computes the capability required by each turret based on the cutting condition of a tool mounted on each turret, the material of a workpiece to be machined, and a machining program, and adds the values of the capabilities of the respective turrets, automatically determines whether the sum exceeds the allowable range of the capability of a machine tool controlled by the NC system, and, if the sum exceeds the allowable capability range, then automatically reduces the depth of a cut to be formed by the turret so that the workpiece can be cut within the allowable capability range of the machine tool.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
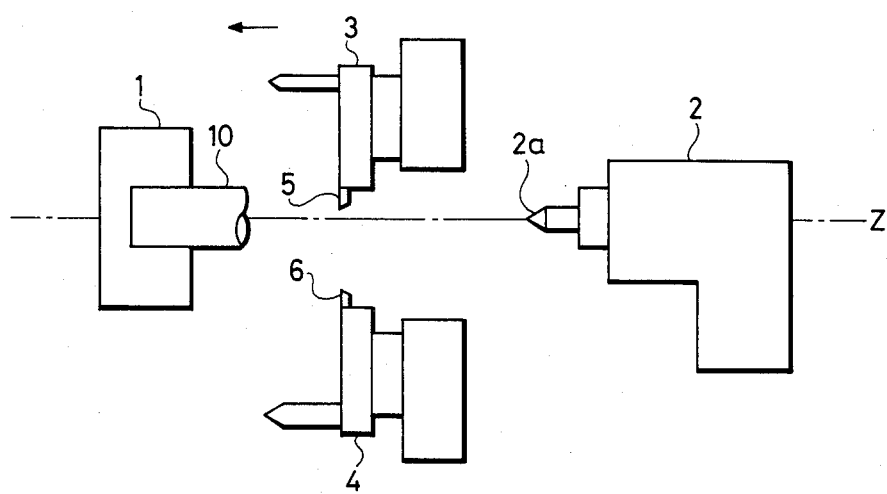
FIG. 1 is a schematic view of a lathe representing a machine tool controlled by an NC system according to the present invention.

FIG. 1 schematically shows a machine tool controlled by an NC system according to the present invention, the machine tool comprising a lathe by way of illustrative example.

A cylindrical workpiece 10 is fixedly clamped by a chuck 1 rotatable about a Z-axis and has one end supported by a tip 2a of a tailstock 2. Cutting tools 5 and 6 are secured respectively to first and second turrets or tool bases 3 and 4. For cutting the workpiece 10, the first and second turrets 3 and 4 are moved in the direction of the arrow to cause the cutting tools 5 and 6 to cut the workpiece 10. With the lathe according to the illustrated embodiment, the workpiece is machined simultaneously by the two turrets 3 and 4. The chuck 1 is rotatably driven by a single spindle motor (not shown), as is well known in the art.

Figure 2:
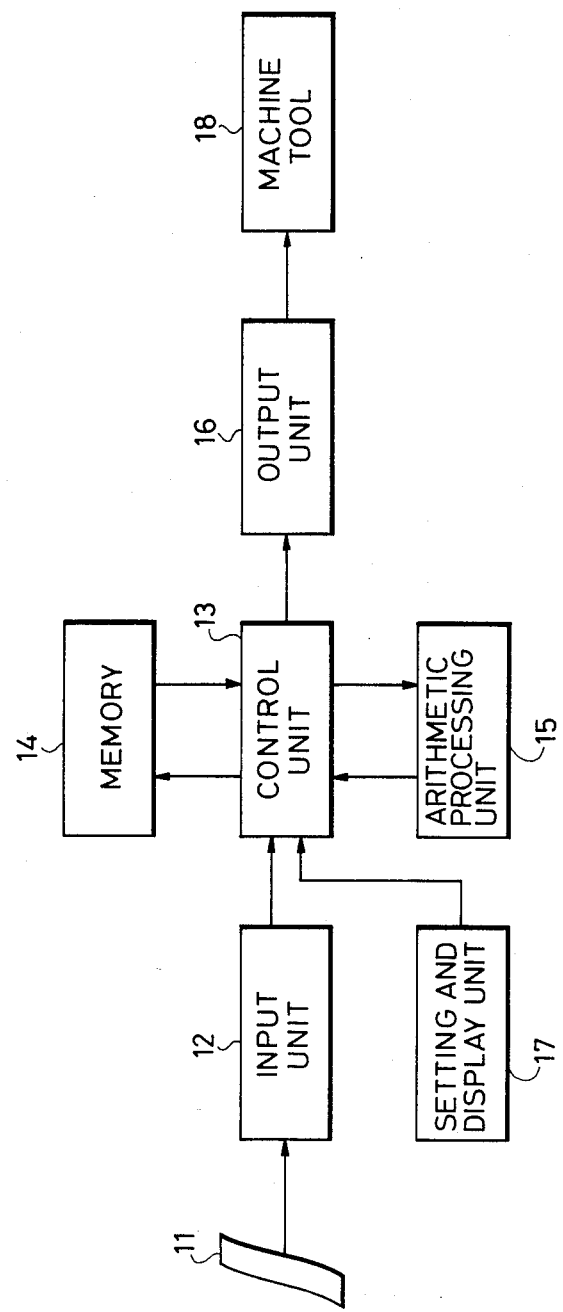
FIG. 2 is a block diagram of the NC system of the present invention.

FIG. 2 illustrates in block form the NC system of the present invention. The NC system is composed of an input unit 12 having a reader for reading an NC tape 11 and includes a command interpretation and processing circuit, a control unit (CPU) 13, a memory 14, an arithmetic processing unit 15, an output unit 16, and a setting and display unit 17 including a CRT and a keyboard. The lathe or machine tool as shown in FIG. 1 which is controlled by the NC system of FIG. 2 is indicated by reference numeral 18.

Figure 3:
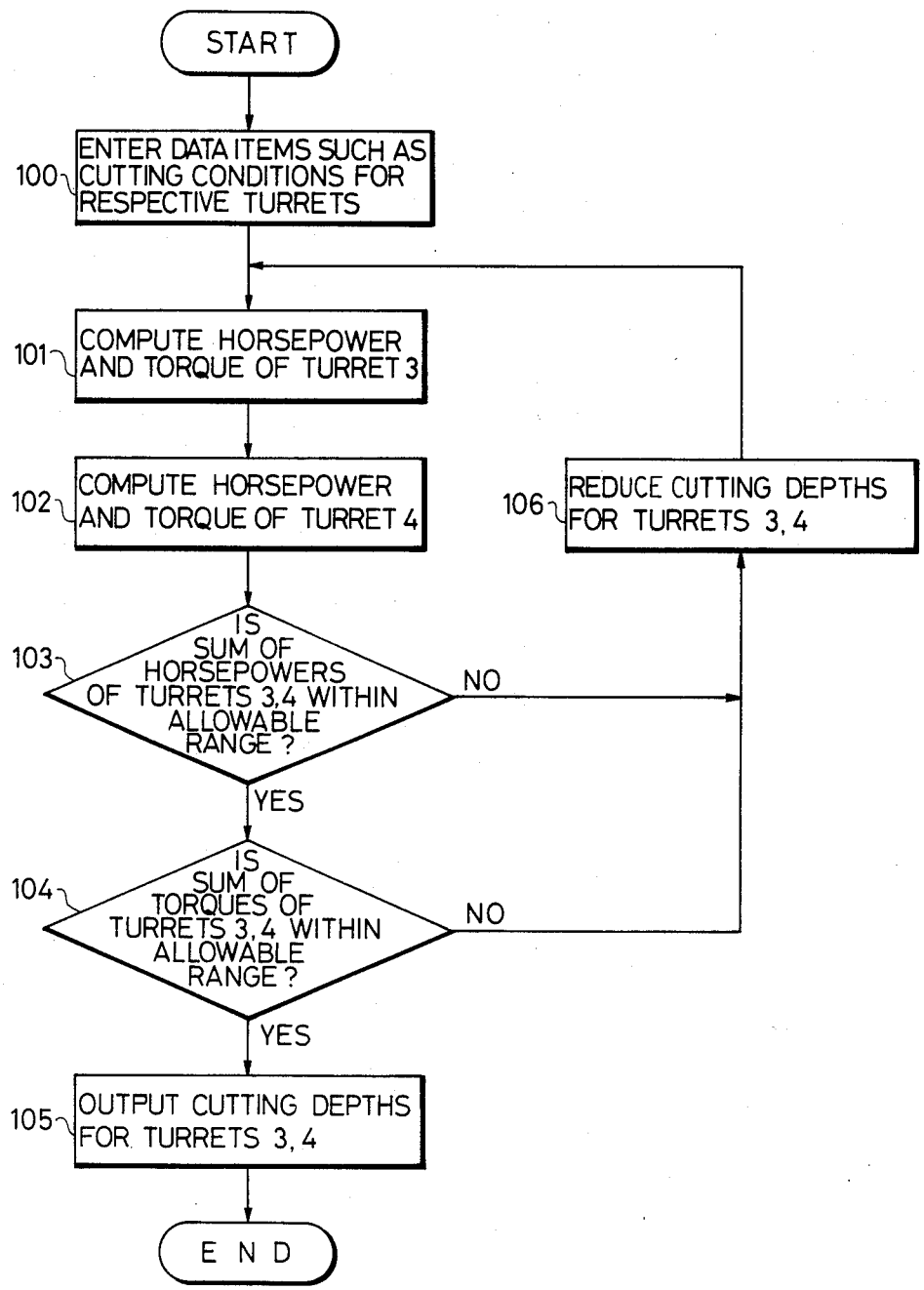
FIG. 3 is a flowchart showing successive steps of the operation of the NC system.

FIG. 3 is a flowchart of progressive steps 100 through 106 of NC machining operations effected by the NC system of the present invention. The operation of the NC system shown in FIG. 2 will be described with reference to FIG. 3.

Various data items are entered in step 100. The data items to be entered include:

$d_1$: depth of cut for the first turret 3 (mm)
$d_2$: depth of cut for the second turret 4 (mm)
$f_1$: speed of feed for the first turret 3 (mm/rev)
$f_2$: speed of feed for the second turret 4 (mm/rev)
$Ks_1$: specific cutting resistance for the first turret 3 (kg/mm$^2$)
$Ks_2$: specific cutting resistance for the second turret 4 (kg/mm$^2$)
$V_1$: cutting speed for the first turret 3 (m/min)
$V_2$: cutting speed for the second turret 4 (m/min)
$D_1$: maximum machined diameter for the first turret 3 (mm)
$D_2$: maximum machine diameter for the second turret 4 (mm)
$x$: ratio of reduction of depth of a cut (%)

η: efficiency of the machine tool 18 (≅0.8)
$N_{max}$: allowable value of power of the machine tool 18 (KW)
$T_{max}$: allowable value of torque of the machine tool 18 (Kg.cm)

Figure 4A:
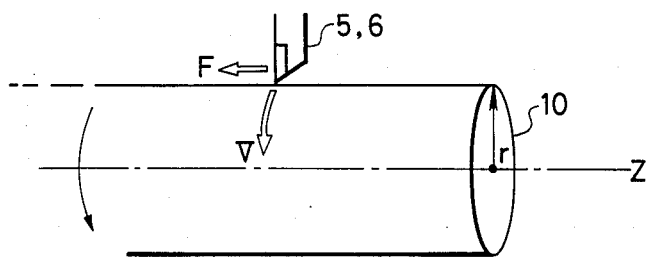
FIGS. 4A through 4D are views of a tool and a workpiece, explanatory of machining data.

The definitions of the above data items will be described:

(1) The speed of feed (mm/rev) indicated by $f_1$ and $f_2$ represents the distance of feed (F) of the tools (cutting tools) 5 and 6 per revolution of the spindle, that is, the distance (mm) through which the cutting tools move while the spindle makes one complete revolution, as shown in FIG. 4A.

(2) The cutting speed (m/min) indicated by $V_1$ and $V_2$ is the relative speed between the workpiece 10 while it is rotating and the tools (cutting tools) 5 and 6, and denotes a peripheral speed (v) where the cutting tools contact the workpiece 10. Where the tools are other than drills, the cutting position normally varies and the radius (r) up to the cutting position changes as the cutting proceeds, and hence the rotary speed (RPM) of the spindle or the workpiece 10 is varied to keep the peripheral speed (v) constant at all times.

Figure 4B:
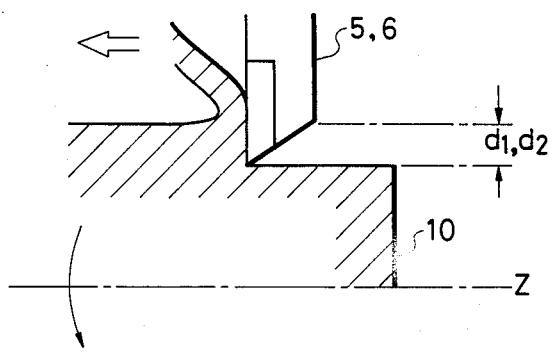

(3) The depth of cut indicated by $d_1$ and $d_2$ means a depth, as shown in FIG. 4B, that the tools cut the workpiece 10 in one operation where the tools 5 and 6 are other than drills which machine only the center of the workpiece 10.

Figure 4C:
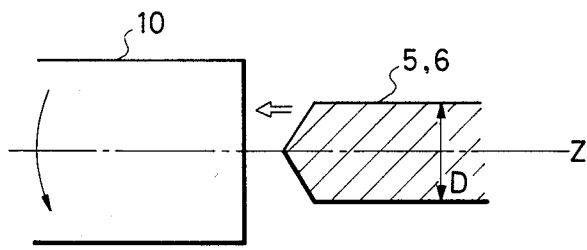
Figure 4D:
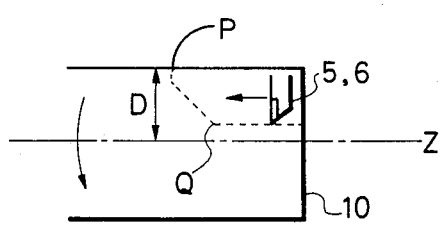

(4) The maximum machining diameter (mm) indicated by $D_1$ and $D_2$ is represented by the diameter D of a drill where the tools 5 and 6 are drills as shown in FIG. 4C, and by the maximum diameter D machined by the turrets 3 and 4 where the tools 5 and 6 are other than drills as shown in FIG. 4D. Designated in FIG. 4D at Q is a machining path of the tool and P a terminating point of the machining path, with the diameter at the point P indicating the maximum machining diameter D.

Among the above various data items, the specific cutting resistances $Ks_1$ and $Ks_2$, the ratio (x) of reduction of the depth of a cut, the machine tool efficiency η, the allowable value $N_{max}$ of machine tool power, and the allowable value $T_{max}$ of machine tool torque are entered by the operator through the setting and display unit 17 (FIG. 2) and are stored in the memory 14. The data items indicating the depths of cuts $d_1$ and $d_2$, the speed of feed $f_1$ and $f_2$, the cutting speed $V_1$ and $V_2$, and the maximum machining diameters $D_1$ and $D_2$ are entered as a machining program from the NC tape 11 through the input unit 12 and are stored in the memory 14.

Then, the values of the power and torque of the first turret 3 are computed in step 101.

The power and the torque are computed by the following approximation formulas:
Formula for computing cutting power
Where the tools are drills:

$$N = \frac{d_1 \times f_1 \times Ks_1 \times V_1}{6120 \times \eta} \times \left(1.173 - \frac{d_1}{D_1}\right) \; [KW],$$

where the depth of a cut $d_1$ is given by:

[drill diameter ($D_1$) − maximum material inside diameter]/2.

Where the tools are other than drills:

$$N = \frac{d_1 \times f_1 \times Ks_1 \times V_1}{6120 \times \eta} \; [KW].$$

Formula for computing cutting torque
Where the tools are drills:

$$T = d_1 \times f_1 \times Ks_1 \times \frac{D_1}{20} \times \left(1.173 - \frac{d_1}{D}\right) \; [Kg \cdot cm],$$

where $D_1$ is the drill diameter or the diameter D in FIG. 4C.

Where the tools are other than drills:

$$T = d_1 \times f_1 \times Ks_1 \times \frac{D_1}{20} \; [Kg \cdot cm],$$

where $D_1$ is the maximum machining diameter or the dimension D in FIG. 4D.

The values of the power and torque of the second turret 4 are computed in the same manner in step 102.

Step 103 determines whether the sum of the powers computed in steps 101 and 102 does not exceed the allowable value $N_{max}$ of the power of the machine tool. If the sum does not exceed the allowable value $N_{max}$ of the power of the machine tool in step 103, in step 104 it is determined whether the sum of the torques computed in steps 101 and 102 does not exceed the allowable value $T_{max}$ of the torque of the machine tool. If the sum of the torques does not exceed the allowable value $T_{max}$ of the torque of the machine tool in step 104, then a machining path is measured on the basis of the depths of cuts $d_1$ and $d_2$ by the turrets and issued as an output based on which the machine tool or lathe cuts the workpiece in step 105. The overall depth of a cut is given by the machining program. If the sum of the powers exceeds the allowable value $N_{max}$ of the power of the machine tool in step 103, then the depths of cuts $d_1$ and $d_2$ by the turrets 3 and 4 are reduced in step 106.

If the sum of the torques exceeds the allowable value $T_{max}$ of the torque of the machine tool in step 104, then the depths of cuts $d_1$ and $d_2$ by the turrets 3 and 4 are reduced in step 106.

Therefore, when the value of powers computed by the arithmetic processing unit 15 exceeds the allowable value $N_{max}$ of the machine tool or lathe, or when the value of torques exceeds the allowable torque value $T_{max}$, an output is produced to reduce the depths of cuts $d_1$ and $d_2$ by the turrets 3 and 4. Based on the depth reduction output, the powers and torques are computed in steps 101 and 102 again, and only when the computed values of powers and torques do not finally exceed the allowable power value $N_{max}$ and the allowable torque value $T_{max}$, a machining path for the tools 5 and 6 is determined on the basis of the cutting depths $d_1$ and $d_2$ and issued as an output for cutting the workpiece in step 105.

The reduction of the cutting depths $d_1$ and $d_2$ can be determined by multiplying the cutting depths by the ratio of reduction x. More specifically, where the ratio of reduction x is defined as a percentage of the cutting depths $d_1$ and $d_2$ prior to correction or reduction, the following equations result:

$$d_1 = d_1 \times \frac{x}{100}, \; \text{and}$$

-continued $$d_2 = d_2 \times \frac{x}{100}.$$

Where the ratio of reduction x is defined as a reduction of a percentage from the cutting depths $d_1$ and $d_2$ prior to correction, the following equations result:

$$d_1 = d_1 \times \frac{100 - x}{100} = d_1 - d_1 \times \frac{x}{100}.$$

In each of the above equations, x is a value in the range of $0 < x < 100$.

The ratio of reduction is entered beforehand as a parameter by the operator through the setting and display unit 17 and stored in the memory 14.

The cutting conditions that can be varied out of the above data items are:
depths of cuts $d_1$ and $d_2$ for the turrets 3 and 4;
speeds of feeds $f_1$ and $f_2$ for the turrets 3 and 4; and
cutting speeds $V_1$ and $V_2$ for the turrets 3 and 4.

Therefore, in order not to exceed the allowable power value $N_{max}$ or the allowable torque value $T_{max}$ through changing the cutting conditions, any one of the above cutting conditions may be changed. However, according to the preferred embodiment of the invention, the cutting depths are varied which have the smallest influence on the cut (such as the roughness of the cut surface). If the other two cutting conditions were altered, adverse influences on the surface being cut or the tools would be more likely to be induced. Therefore, alteration of the cutting depths $d_1$, $d_2$ is considered to be most appropriate for practical purposes.

In the above embodiment, the sum of powers and the sum of torques required by the machine tool are brought into the allowable ranges by reducing the cutting depths for the turrets at the same ratio. However, the cutting conditions (such as cutting depth) for only one turret may be varied, and separate ratios of reduction or methods of reduction may be established respectively for the two turrets. This alternative can be applied to a machine tool for machining a workpiece simultaneously with three or more turrets.

With the NC system of the present invention, a workpiece can be cut simultaneously with a plurality of turrets by a power and torque kept within the allowable ranges of a machine tool controlled by the NC system. The present invention can be implemented at a low cost, and is particularly advantageous when incorporated in an NC system having an automatic programming capability.

Although a certain preferred embodiment has been shown and described, it should be understood that many changes and modifications may be made therein without departing from the scope of the appended claims.

What is claimed is:

1. A numerical control method for controlling a lathe including a plurality of machine tools having a plurality of turrets, said method comprising the steps of:
   supplying data items indicative of cutting conditions for respective tools mounted on the turrets, a machining program, and material conditions of a workpiece to be cut by the machine tools, said cutting conditions including a desired final depth of cut along the workpiece and an incremental depth of cut to be achieved during a given cutting operation;
   computing a machining capacity required to cut the workpiece based on said cutting conditions, machining program, and material conditions, said computing step being computed in accordance with at least one of an allowable overall power and an allowable overall torque of all of said tools together;
   determining whether said machining capacity is outside a range of one of said allowable overall power and said allowable overall torque;
   issuing an output to correct the cutting conditions by varying said incremental depth of cut by the tools with respect to the workpiece when the value of the machining capacity is outside at least one of the allowable overall torque range and the allowable overall power range to correct the machining capacity required to cut the workpiece into the allowable operating parameter range of the machine tools, said varying of incremental depth of cut in turn increasing the number of cutting operations required along the workpiece to achieve said final depth of cut; and
   issuing the reduced cutting conditions to the machine tools.

2. The numerical control method according to claim 1, wherein said machining capacity required to cut the workpiece is computed as a power and a torque, and further comprising the step of storing said allowable operating parameters an an allowable power and an allowable torque.

3. The numerical control method according to claim 1, wherein said cutting conditions include depths of cuts by the tools with respect to the workpiece, speeds of feeding of the tools, and cutting speeds of the tools.

4. The numerical control method according to claim 3, wherein the depths of cuts by the tools with respect to the workpiece, the speeds of feeding of the tools, and the cutting speeds of the tools are entered from a recording medium to said control device.

* * * * *